(No Model.)
E. W. ANDREWS.
FARE COLLECTOR FOR STREET CARS.
No. 258,271. Patented May 23, 1882.
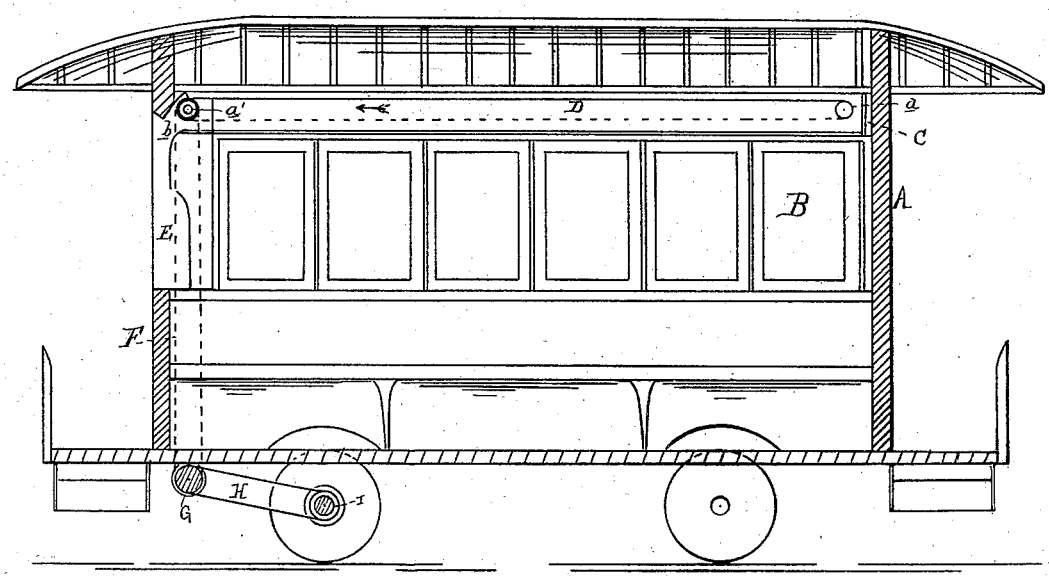
Attest:
Charles J. Hunt
E. Scully.
Inventor:
Edward W. Andrews.
By
Attorney.

UNITED STATES PATENT OFFICE.

EDWARD W. ANDREWS, OF DETROIT, MICHIGAN, ASSIGNOR OF ONE-THIRD TO JOHN H. EAKINS, OF SAME PLACE.

FARE-COLLECTOR FOR STREET-CARS.

SPECIFICATION forming part of Letters Patent No. 258,271, dated May 23, 1882.

Application filed March 4, 1882. (No model.)

*To all whom it may concern:*

Be it known that I, EDWARD W. ANDREWS, of Detroit, in the county of Wayne and State of Michigan, have invented new and useful Improvements in Fare-Collectors for Street-Cars; and I hereby declare that the following is a full, clear, and exact description thereof, reference being had to the accompanying drawing, which forms a part of this specification.

The nature of this invention relates to certain new and useful improvements in that class of horse-railway cars popularly termed "bobtails," which are provided with a fare-receiving box, into which the honest passenger will deposit his fare, and which was often avoided by dishonest passengers upon the plea that they cannot reach the receiving-box.

The invention consists in providing a means by which the passenger can deposit his fare, which will deliver said fare into the receiving-box from the rear end of the car or any point intermediate between that and the front end thereof, substantially as hereinafter described.

In the accompanying drawing a car of the description named is shown in vertical central section. A represents the body of the car, and above the windows B thereof is placed a small box, C, extending the whole length of the car, or nearly so, the top of the box being open. At each end of the box is journaled a small wheel or pulley, *a*, around which passes the belt D.

E is the fare-receiving box, so arranged with relation to the belt that in the rotation of the belt the fare deposited on it will be carried into the receiving-box through the mouth *b*, leading thereto. A belt, F, (shown in dotted outlines,) running upon a pulley upon the same shaft upon which the pulley *a'* is journaled, communicates motion to the belt toward the front end of the car from the pulley G, which is preferably situated underneath the floor of the car, and receives motion by means of the belt H and the forward axle, I, as plainly shown in the drawing.

Instead of the belts F and H, rods with suitable gears may be employed to give motion to the belt D, and under certain circumstances might be found preferable; and this might be done without interfering with the spirit of my invention, by the use of which the passenger might deposit his fare upon the belt, which in its forward motion carries it into the fare-receiving box, which may be of any of the known constructions.

What I claim as my invention is—

1. The combination, with a car and the fare-receiving box thereof, of an endless belt, arranged and operating substantially as and for the purposes set forth.

2. In a car, and in combination with the receiving-box thereof, an endless belt running in an open-top box situated above the windows of said car and actuated by the rotation of the car-axle, substantially as and for the purposes specified.

EDWARD W. ANDREWS.

Witnesses:
H. S. SPRAGUE,
CHARLES J. HUNT.